(12) United States Patent
Cary et al.

(10) Patent No.: US 11,274,625 B2
(45) Date of Patent: Mar. 15, 2022

(54) METHOD OF CONTROLLING A VEHICLE ASSEMBLY

(71) Applicant: Ford Global Technologies, LLC, Dearborn, MI (US)

(72) Inventors: Mark Cary, Preston (GB); Barnaby Coates, Basildon (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/170,930

(22) Filed: Feb. 9, 2021

(65) Prior Publication Data
US 2021/0246848 A1    Aug. 12, 2021

(30) Foreign Application Priority Data
Feb. 11, 2020 (GB) ..................................... 2001826

(51) Int. Cl.
*F02D 43/04* (2006.01)
*F02D 41/00* (2006.01)

(52) U.S. Cl.
CPC ........... *F02D 43/04* (2013.01); *F02D 41/009* (2013.01); *F02D 41/0097* (2013.01); *F02D 2200/08* (2013.01)

(58) Field of Classification Search
CPC .... F02D 43/04; F02D 41/009; F02D 41/0097; F02D 2200/08; F02D 41/00; B60R 16/00; B60W 50/04; G01M 15/04
See application file for complete search history.

(56) References Cited

U.S. PATENT DOCUMENTS

| 5,105,651 A | 4/1992 | Gutmann |
| 5,671,158 A | 9/1997 | Fournier et al. |

(Continued)

FOREIGN PATENT DOCUMENTS

| DE | 102017107271 A1 | 7/2017 |
| DE | 102016104996 A1 | 9/2017 |

(Continued)

OTHER PUBLICATIONS

UK Search Report dated Aug. 19, 2020 re Appl. No. GB2001826.3.

*Primary Examiner* — Joseph J Dallo
(74) *Attorney, Agent, or Firm* — Brandon Hicks; Bejin Bieneman PLC

(57) ABSTRACT

Controlling a vehicle assembly can include determining a first time series of an operating parameter of the vehicle assembly defining a first drive cycle, the first drive cycle for testing one or more performance parameters of the vehicle assembly; identifying a plurality of ranges of the operating parameter during the first drive cycle; determining probabilities of the vehicle assembly operating in and/or transitioning between the ranges of the operating parameter during the first drive cycle; determining one or more second time series of the operating parameter defining one or more second drive cycles, the one or more second time series having a different duration from the first time series, wherein the one or more second time series are determined based on the determined probabilities of the vehicle assembly operating in and/or transitioning between the ranges of the operating parameter during the first drive cycle; and controlling the vehicle assembly and/or a further vehicle assembly to perform one or more of the second drive cycles using the determined second time series.

20 Claims, 3 Drawing Sheets

(56) References Cited

U.S. PATENT DOCUMENTS

| | | | |
|---|---|---|---|
| 10,163,601 B1* | 12/2018 | Raveh | H01J 37/244 |
| 11,001,211 B2* | 5/2021 | Durkop | G06F 11/0796 |
| 2018/0329408 A1* | 11/2018 | Schultalbers | G06F 11/261 |

FOREIGN PATENT DOCUMENTS

| | | |
|---|---|---|
| DE | 102017129391 A1 | 2/2018 |
| DE | 102017002107 A1 | 9/2018 |
| WO | 199925965 A1 | 5/1999 |
| WO | 2017004647 A1 | 1/2017 |

* cited by examiner

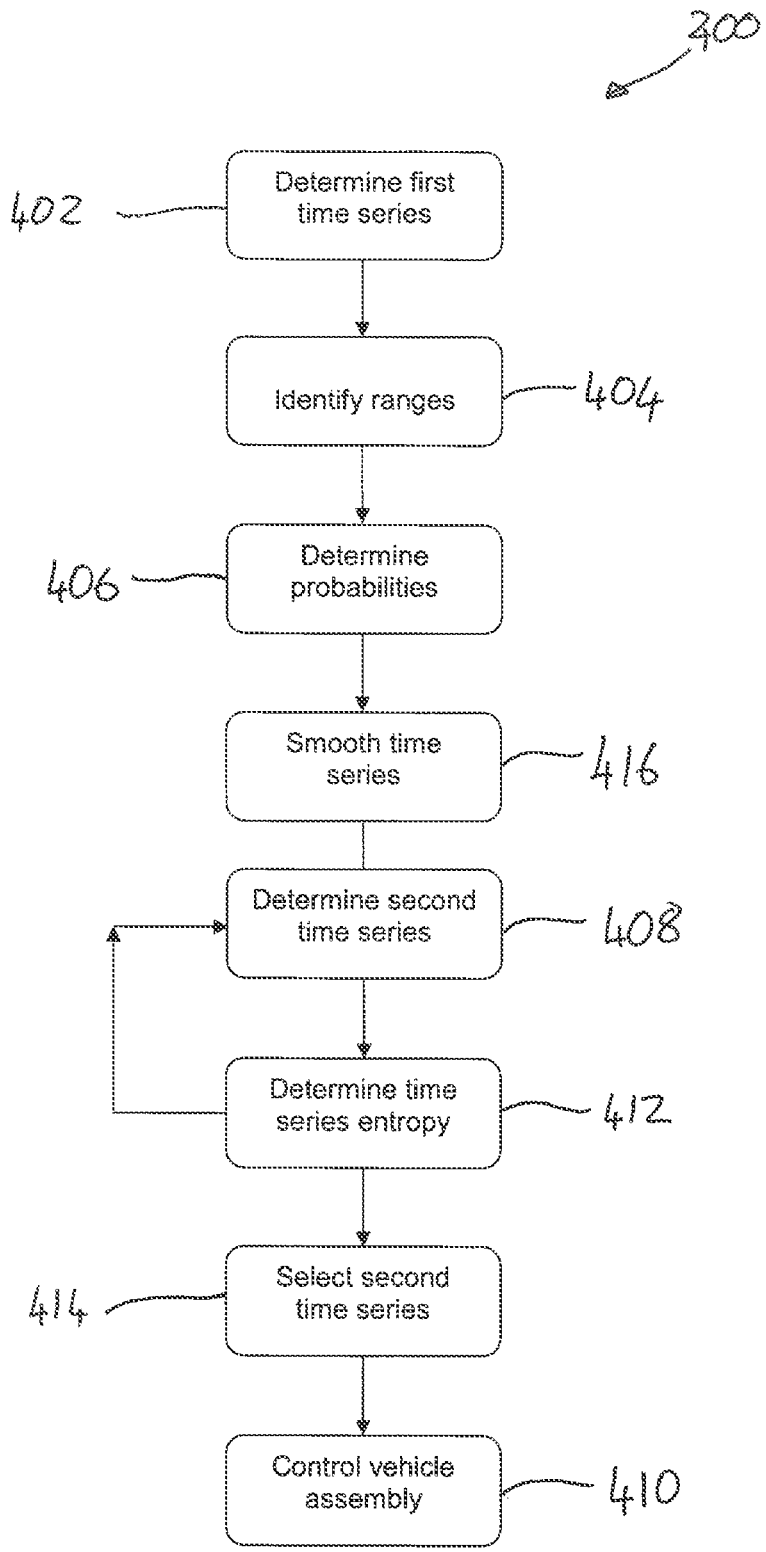

METHOD OF CONTROLLING A VEHICLE ASSEMBLY

CROSS-REFERENCE TO RELATED APPLICATION

This patent application claims priority to UK Application No. GB 2001826.3 filed on Feb. 11, 2020, which is hereby incorporated by reference in its entirety.

BACKGROUND

During development of a vehicle, such as a motor vehicle, vehicle assemblies of the vehicle are tested in order to determine one or more performance parameters of the vehicle assembly. In particular, performance parameters of the vehicle assembly may be tested in order to confirm that the vehicle assembly meets legislated performance requirements. For example, an engine assembly for a vehicle may be tested to ensure that the engine assembly is able to operate within legislated emissions standards.

During the testing procedure, an operating parameter of the vehicle assembly may be controlled in order to operate the vehicle assembly over a drive cycle, the profile of which may be specified according to the test being performed. For example, the vehicle assembly may be operated to follow a Worldwide harmonized Light-duty vehicles Test Cycle (WLTC) in order to perform an emissions test.

During the development of a vehicle assembly, it is desirable to ensure that the vehicle assembly meets the legislated performance requirements and/or performance requirements specified by the vehicle manufacturer. It is therefore desirable to perform tests on the vehicle assembly during development and calibrate the operation of the vehicle assembly based on the test results.

The performance of the vehicle assembly during a particular test procedure may vary based on a large number of calibratable parameters of the vehicle assembly, which interact with one another to determine the performance. It may therefore be desirable to perform a plurality of test cycles in order to appropriately calibrate each of the calibratable parameters of the vehicle assembly to achieve the desired performance.

It is desirable that the performance of the vehicle assembly during development testing is representative of the performance of the vehicle assembly during validation testing. However, operating the vehicle assembly to perform a plurality of test drive cycles during vehicle development can be time consuming.

SUMMARY

The present disclosure relates controlling a vehicle assembly including controlling a vehicle assembly in order to reduce a test drive cycle duration.

According to an aspect of the present disclosure, there is provided a method of controlling a vehicle assembly, the method comprising:
determining a first time series of an operating parameter of the vehicle assembly defining a first drive cycle, the first drive cycle for testing one or more performance parameters of the vehicle assembly;
identifying a plurality of ranges of the operating parameter during the first drive cycle;
determining probabilities of the vehicle assembly operating in and/or transitioning between the ranges of the operating parameter during the first drive cycle;
determining one or more second time series of the operating parameter defining one or more second drive cycles, the one or more second time series having a different duration from, e.g. shorter or longer than, the first time series, wherein the one or more second time series are determined based on the determined probabilities of the vehicle assembly operating in and/or transitioning between the ranges of the operating parameter during the first drive cycle; and controlling the vehicle assembly and/or a further vehicle assembly to perform one or more of the second drive cycles using the determined second time series.

Determining the probabilities of the vehicle assembly operating in and/or transitioning between the ranges of the operating parameter during the first drive cycle may comprise determining, for each of the ranges of the operating parameter, the probability of the vehicle assembly transitioning from operating in the particular range to operating in another range within a particular time interval, e.g. a higher adjacent range or a lower adjacent range.

The method may comprise determining a plurality of second time series based on the determined probabilities of the vehicle assembly operating in and/or transitioning between the ranges of the operating parameter during the first drive cycle. For example, by using a plurality of random numbers together with the probabilities to determine the values of the operating parameter within the second time series. The method may further comprise selecting one or more of the determined second time series based on the entropy of the second time series. The vehicle assembly or further vehicle assembly may be controlled to perform the second drive cycle or cycles according to the selected second time series.

The one of the determined second time series may be selected based on a comparison between an entropy, e.g. information entropy, of the first time series and the entropy, e.g. information entropy, of the second time series. For example, the second time series may be selected based on the differences in Shannon entropy, relative entropy or Kullback-Leibler divergence between the first and second time series. In particular, the one of the second time series having the smallest Kullback-Leibler divergence from the first time series or a smoothed, filtered or approximated version of the first time series may be selected.

The method may comprise determining a smoothed representation of the first time series. For example, by fitting one or more, e.g. a plurality, of polynomial curves to the first time series, e.g. by fitting one or more splines, such as basis splines, comprising 2 or more knots to the first time series. The entropy comparison between the first and second time series may be made between the second time series and the smoothed representation of the first time series.

The method may comprise comparing the entropies of the one or more second time series relative to the first time series to a threshold divergence. The method may further comprise determining one or more further second time series, if the entropies of the one or more second time series are greater than the threshold divergence.

Determining the one or more second time series of the operating parameter may comprise determining values of the operating parameter over a predetermined period of time using one or more random numbers and the determined probabilities of the vehicle assembly operating in and/or transitioning between the ranges of the operating parameter during the first drive cycle.

The method may further comprise determining the performance parameter or a further performance parameter of the vehicle assembly and/or further vehicle assembly during the second drive cycle. One or more values of the performance parameter or further performance parameter may be determined, e.g. measured, during the second drive cycle.

The method may further comprise configuring and/or calibrating the operation of the vehicle assembly and/or further vehicle assembly, or one or more components thereof, based on the performance parameter or further performance parameter determined during the second drive cycle.

The operating parameter may be a speed of the vehicle in which the vehicle assembly is provided, e.g. determined and/or controlled using a testing apparatus, such as a dynamometer, on which the vehicle assembly is installed. The performance parameter may be an emissions value of the vehicle such as an amount or concentration of one or more of Carbon dioxide, Carbon monoxide, Nitrogen Oxides ($NO_x$), unburnt hydrocarbons, particulate matter, e.g. course particulate matter (PM10) and/or fine particulate matter (PM2.5), and/or any other substance.

According to another aspect of the present disclosure, there is provided a computer program product, e.g. a computer-readable medium, such as a non-transitory computer readable medium, comprising instructions which, when executed by a computing apparatus, cause the computing apparatus to perform the above-mentioned method.

To avoid unnecessary duplication of effort and repetition of text in the specification, certain features are described in relation to only one or several aspects or embodiments. However, it is to be understood that, where it is technically possible, features described in relation to any aspect or embodiment any other aspect or embodiment disclosed herein.

BRIEF DESCRIPTION OF THE DRAWINGS

For a better understanding of the present disclosure, and to show more clearly how it may be carried into effect, reference will now be made, by way of example, to the accompanying drawings, in which:

FIG. 4 is a flow chart depicting a method of controlling an engine assembly according to another arrangement of the present disclosure.

DETAILED DESCRIPTION

The present disclosure relates to a method for controlling a vehicle assembly for a vehicle, such as a motor vehicle (e.g. car, van, truck, motorcycle etc.), an industrial or agricultural vehicle (e.g. tractor, forklift, bulldozer, excavator etc), a marine vessel, aircraft or any other type of vehicle.

Figure 1:
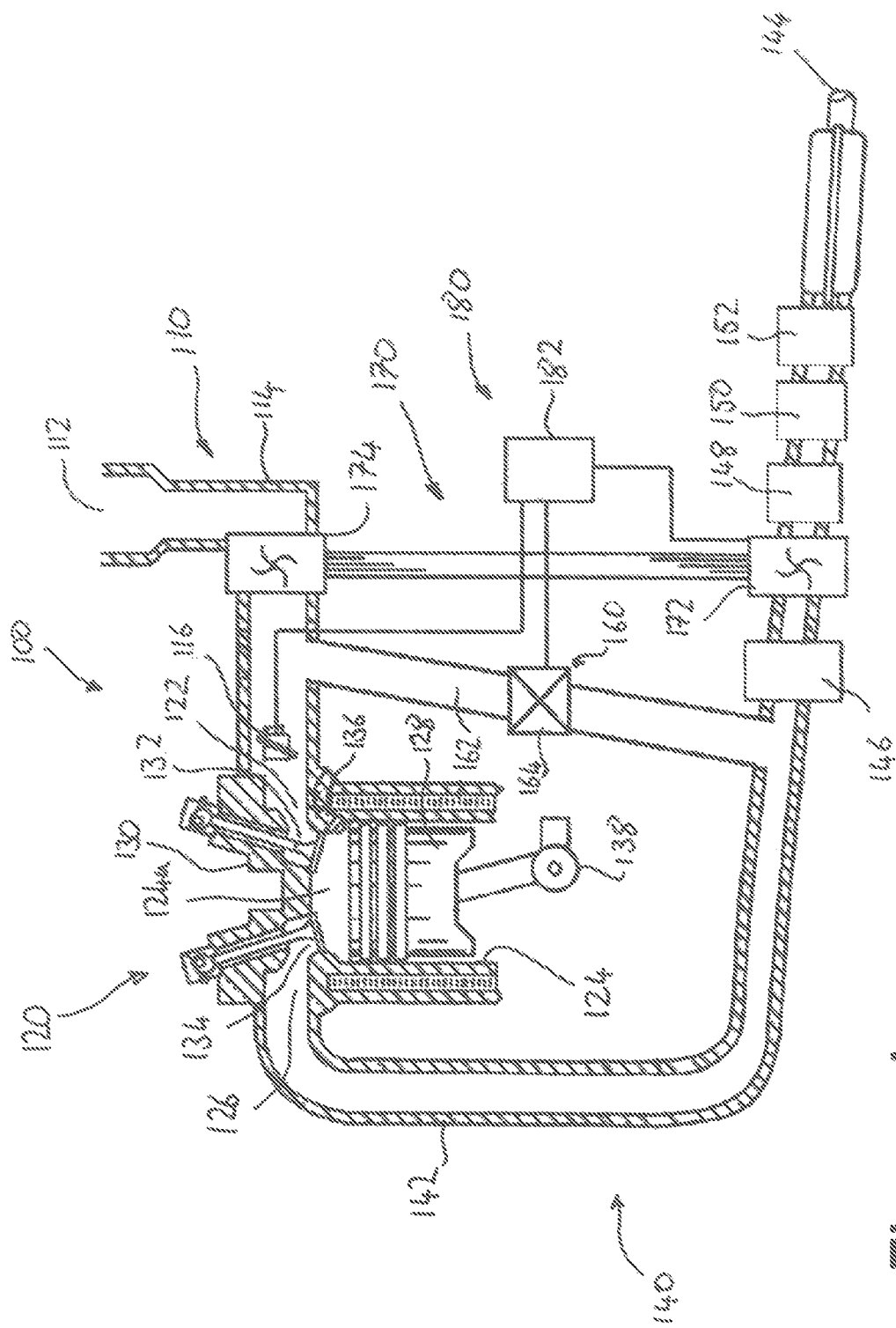
FIG. 1 is a schematic view a vehicle assembly.

With reference to FIG. 1, a vehicle assembly, such as an engine assembly 100 may comprise an intake system 110, an engine 120, an exhaust system 140 and a control system 180.

The control system may comprise a controller 182 configured to control the operation of the engine assembly 100.

The intake system 110 comprises an air inlet 112 and an intake duct 114. During operation of the engine 120, air is drawn into the intake system 110 via the air inlet 112 and carried to an inlet manifold 122 of the engine 120 by the intake duct 114. The intake system 110 may comprise a throttle 116 configured to allow a pressure drop between the air inlet 112 and the inlet manifold 122 to be selectively varied. The position of the throttle may be varied in order to control the operation of the engine 120. The throttle 116 may be controlled by the controller 182, e.g. based on an acceleration control input from a driver or another controller.

The engine 120 comprises the inlet manifold 122, a cylinder 124 and an exhaust manifold 134. A piston 128 is provided within the cylinder 124 and is configured to reciprocate within the cylinder 124 during a combustion cycle of the engine 120. A combustion chamber 124a of the cylinder 124 is defined by one side of the piston 128, the walls of the cylinder 124 and a cylinder head 130.

The engine 120 further comprises one or more inlet valves 132 and one or more exhaust valves 134 to control the flow of inlet and exhaust gases into and out of the cylinder 124 respectively.

During an intake stroke, the piston 128 moves within the cylinder 124 to increase the volume of the combustion chamber 124a, drawing inlet gases from the inlet manifold 122 into the cylinder via the inlet valves 132. Following the intake stroke, the inlet valve 132 is closed and the gases within the cylinder 124 are compressed as the piston 128 moves back towards the cylinder head 130, reducing the volume of the combustion chamber 124a.

Fuel is injected into the cylinder 124 via one or more fuel injectors 136 and the air and fuel mixture is ignited by virtue of the high pressure and temperature within the combustion chamber 124a. Combustion of the air and fuel mixture produces expanding combustion gases that act against the piston 128 to drive a crank shaft 138 of the engine 120.

The timing with which fuel is injected into the cylinder 124, and the amount of fuel injected relative to the amount of inlet air, may affect the power and/or torque produced by the engine. The timing and amount of fuel being injected may also affect the efficiency at which the engine is operation. Furthermore, the timing and amount of fuel, and the amount of inlet air introduced into the cylinder 124 may affect the production of polluting gases during combustion.

The controller 182 may be configured to control, e.g. directly control, the operation of the engine 120, e.g. by controlling the timing and quantity of fuel being introduced into the cylinder 124 by the injector 136.

Figure 2:
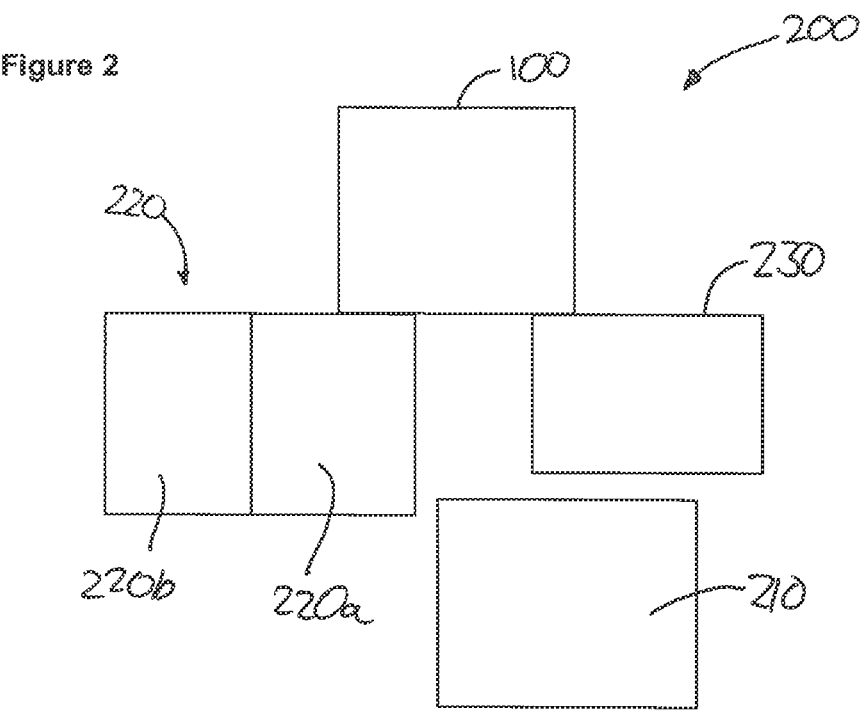
FIG. 2 is a schematic view of a test assembly for the vehicle assembly shown in FIG. 1.

In the arrangement depicted in FIG. 1, the engine 120 is a compression ignition engine. However, it is equally envisaged that the present disclosure may apply to any other type of engine, such as a spark ignition engine in which the fuel-air mixture within the cylinder 124 is ignited by a spark plug. Furthermore, although a single cylinder is shown in FIG. 2, the engine 120 may comprise any number of cylinders, such as 2, 3, 4, 6, 8 or more than 8 cylinders.

During an exhaust stroke of the piston 128, exhaust gases produced through the combustion within the cylinder are exhausted from the cylinder 124 into the exhaust manifold 126 via the exhaust valve 134.

An exhaust duct 142 of the exhaust system 140 is arranged to carry the exhaust gases from the exhaust manifold 126 to an exhaust outlet 144 to be emitted from the vehicle.

The exhaust system 140 further comprises one or more exhaust gas after-treatment devices configured to reduce the concentrations of one or more pollutant substances within the exhaust gases. For example, in the arrangement depicted, the exhaust system 140 comprises a catalytic oxidation device 146, configured to oxidise soot and/or carbon monoxide, a $NO_x$ adsorber 148, configured to adsorb $NO_x$ from the exhaust gases, a particulate filter 150, configured to capture particular matter from the exhaust gases, and a catalytic reduction device 152 configured to remove $NO_x$ from the exhaust gases through a chemical reduction reaction in the presence of a catalyst.

In some arrangements, the exhaust system 140 may comprise other exhaust gas after-treatment devices in additional or as an alternative to those depicted in FIG. 1. Alternatively, one or more of the after-treatment devices shown in FIG. 1 may be omitted. In some arrangements, two or more after-treatment devices may be combined into a single device. For example, the exhaust system 140 may comprise a combined particulate filter and catalytic reduction device.

The operation of the exhaust gas after-treatment devices may be controlled in order to adjust the performance of the devices in removing pollutants from the exhaust gases. For example, the performance of the catalytic reduction device 152 may be adjusted by controlling the amount of reductant that is introduced.

The operation of one or more of the exhaust gas after-treatment devices may be controlled, e.g. by the controller 182, in order to conform to one or more emissions requirements. The emissions requirements may be predetermined emissions requirements. For example, the emissions requirements may be set by legislation.

The engine assembly 100 may further comprise an Exhaust Gas Recirculation (EGR) system 160. The EGR system 160 comprises an EGR duct 162 configured to recirculate a portion of the exhaust gases to the intake system 110 of the engine assembly 100, e.g. to the intake duct 114 or to the inlet manifold 122. The EGR system 160 further comprises an EGR valve 164 configured to control the flow of exhaust gases through the EGR duct 162.

Replacing a portion of the oxygen rich inlet air within the engine cylinder 124 with burnt exhaust gases reduces the volume of the combustion chamber 124a that is available for combustion. This reduces the peak temperature of combustion, thereby reducing the formation of $NO_x$.

As depicted in FIG. 1, the engine assembly 100 may further comprise a turbocharger 170 including an exhaust driven turbine 172 arranged in the exhaust duct 142 and a compressor 174 arranged in the intake duct 114. The turbine 172 and the compressor 174 are coupled to the same shaft so that the compressor 174 can be driven by the turbine 172 to increase the pressure of inlet gases entering the inlet manifold 122.

By appropriately controlling the operation of the turbocharger 170 and the EGR system 160, $NO_x$ emissions can be controlled without reducing the power provided by the engine 120. Additionally, controlling the operation of the turbocharger 170 and/or the EGR system 160 can be used to control the efficiency at which the engine 120 is operating.

As described above, the engine assembly 100 comprises a plurality of components and sub-systems which are controlled, e.g. by the controller 182, during the operating of the engine assembly in order to affect the emissions produced by the engine assembly. Furthermore, the operations of one or more of the components and sub-systems may interact with one another to affect the quantity of polluting emissions produced and emitted by the engine assembly. Configuring and/or calibrating each of the components and sub-system of the engine assembly 100 as well as the controller 182, in order to meet legislated emissions requirement, is therefore a highly complex process.

During development of the vehicle assembly, the vehicle assembly may be tested in order to acquire performance data relating to the vehicle assembly, which may be used to calibrate and configure components, subsystems and/or controllers of the vehicle assembly in order to meet target performance parameters, such as legislated emissions requirements. Further, when the production version of the vehicle assembly has been developed, the production version of the vehicle assembly may be tested, e.g. accordingly to a legislated test procedure, in order to certify that the vehicle assembly meets the legislated requirements, e.g. legislated emissions requirements.

With reference to FIG. 2, a vehicle assembly, such as the engine assembly 100 may be tested using a testing apparatus 200. The testing apparatus 200 comprises the engine assembly 100, a controller 210 for controlling and monitoring the operation of the vehicle assembly, and one or more operation and performance monitoring devices 220, 230, e.g. sensors, for determining, e.g. measuring, operation and performance parameters of the vehicle assembly.

For example, when the vehicle assembly comprises the engine assembly 100, the operation monitoring device 220 may comprise a drive train 220a to be operatively connected to the engine assembly 100 and a dynamometer 220b, such as a rolling road, for measuring operating parameters of the engine assembly 100 via the drive train 220a. For example, the dynamometer 220b may be configured to determine an equivalent road speed of a vehicle in which the vehicle assembly may be installed.

The performance monitoring device 230 may comprise an emissions monitoring device configured to determine the amount and/or concentration of emissions, e.g. polluting emissions, being produced, e.g. emitted, by or by virtue of the operation of the vehicle assembly. For example, the performance monitoring device 230 may be configured to determine, e.g. measure an amount and/or concentration of Carbon dioxide, Carbon monoxide, Nitrogen Oxides ($NO_x$), unburnt hydrocarbons, particulate matter, e.g. course particulate matter (PM10) and/or fine particulate matter (PM2.5), and/or any other substance emitted by the engine assembly 100. In other arrangements, the operating and performance monitoring device 230 may be any other device or devices for measuring any other operating and/or performance parameters of the vehicle assembly being tested.

The vehicle assembly, e.g. the engine assembly 100, may be controlled by the controller 210 using, or based on, a series of one or more operating parameters defining a test drive cycle, which the vehicle assembly is controlled to operate according to. For example, the controller 210 may control the operation of the vehicle assembly so that the operation of the vehicle assembly follows a series of vehicle speeds over the length of the test, e.g. by accelerating and decelerating the operation of the vehicle assembly during the testing procedure. The controller 210 may be in communication with a controller of the vehicle assembly, such as the controller 182 of the engine assembly 100, in order to control the operation of the vehicle assembly. In some arrangements, functions of the controller 210 may be performed by a controller of the vehicle assembly, such as the controller 182.

As mentioned above, it may be desirable for the vehicle assembly to be tested using the testing apparatus 200 during development of the vehicle assembly, in order to configure and/or calibrate one or more components, sub-systems and/or controllers of the vehicle assembly to meet desired performance criteria.

As described above, legislated vehicle performance requirements, such as emissions requirements may specify that the performance of the vehicle assembly is determined over a legislated drive cycle or drive cycle having legislated criteria. It is therefore desirable that the testing procedure performed during the vehicle assembly development process be representative of the legislated drive cycle. In particular, it is desirable that the drive cycle performed during testing allows for the same quantity and quality of vehicle performance data to be captured.

In order to obtain appropriate test data during vehicle assembly development, one option is to test the vehicle assembly by controlling the vehicle assembly to perform a legislated drive cycle, such as a Worldwide harmonized Light-duty vehicles Test Cycle (WLTC). However, it is also desirable for testing time to be minimised in order to allow additional test to be performed using the testing facilities.

Figure 3:
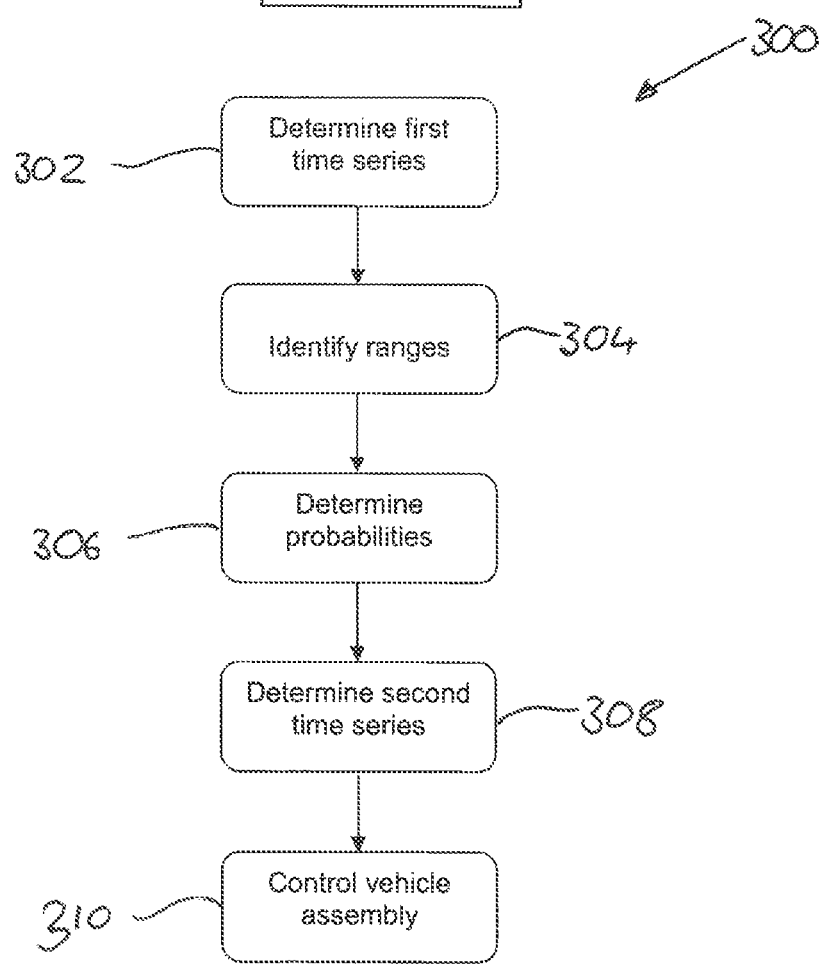
FIG. 3 is a flow chart depicting a method of controlling an engine assembly according to arrangements of the present disclosure.

With reference to FIG. 3, a vehicle assembly, such as the engine assembly 100, may be controlled accordingly to a method 300, e.g. in order to perform a vehicle assembly performance test in a reduced period of time compared to a test performed over a legislated drive cycle.

The method 300 comprises a first block 302 at which a first time series of an operating parameter of the vehicle assembly is determined. The first time series of the operating parameter defines a first drive cycle of the vehicle assembly. For example, the first time series may comprise a time series of vehicle speeds over the length of the first drive cycle. The first drive cycle may be a legislated drive cycle, such as a WLTC, and the vehicle assembly may be controllable to operate according to the first drive cycle whilst one or more performance parameters of the vehicle assembly are determined, e.g. measured, to perform a testing and/or validation procedure for the vehicle assembly, e.g. to determine whether the vehicle assembly meets a performance requirement, such as a legislated performance requirement.

The method 300 comprises a second block 304 at which a plurality of ranges of the operating parameter during the first drive cycle are determined. For example, a plurality of ranges of vehicle speed, having an interval of, for example, 1 KPH to 5 KPH or 1 MPH to 5 MPH, may be identified. The interval of the range may be selected such that the interval is sufficiently small to enable to transient fluctuations of the time series within the range to be approximated in an efficient manner, as described below with reference to FIG. 4, whilst being sufficiently large to enable transient behaviour at relevant scales, e.g. scales at which the performance parameter(s) of the vehicle vary by a measurable amount, to be captured within the ranges.

At a third block 306 of the method 300, probabilities of the vehicle assembly operating in and/or transitioning between the ranges of the operating parameter during the first drive cycle are determined. For example, the probability of the vehicle operating within any or each one of the ranges at any time during the first drive cycle may be determined. For example, the probability of the vehicle assembly operating at a speed of between 32 and 33 mph may be determined. Additionally or alternatively, the probability of the operating parameter transitioning out of a particular range within a particular time during the first drive cycle to either a higher or lower adjacent range may be determined. For example, the probability of the vehicle assembly transitioning out of a first range of 32 to 33 mph to a second range of 33 to 34 mph within 1 second of entering the first range may be determined.

The method 300 comprises a fourth block 308, at which one or more second time series of the operating parameter, defining one or more second drive cycles, are determined. The one or more second time series may have a different duration from the first time series. For example, the one or more second time series may have a shorter duration than the first time series.

The one or more second time series may be determined based on the determined probabilities of the vehicle assembly operating in and/or transitioning between the ranges of the operating parameter during the first drive cycle. For example, a plurality of random numbers, e.g. between 1 and 100 or any other range, may be determined and the values of the operating parameter may be determined based on the value of the random number and the determined probabilities of the operating parameter being within and/or transitioning from a particular range.

For example, in one arrangement, it may have been determined that there is a 20% probability of the vehicle assembly transitioning out of a particular range of the operating parameter to a higher (adjacent) range after 1 second or less and a 10% probability of the vehicle assembly transitioning out of the particular range of the operating parameter to a lower (adjacent) range after 1 second or less. If a random number is determined (between 1 and 100) that is between 1 and 20, the second time series of operating parameters may be generated such that the operating parameters transition out of the particular range of the operating parameter to the higher range within 1 second. Alternatively, if the random number is between 21 and 30, the second time series of operating parameters may be generated such that the operating parameters transition out of the particular range of the operating parameter to the lower range within 1 second. Alternatively again, if the random number is between 31 and 100, the second time series of operating parameters may be generated such that the operating parameters transition out of the particular range of the operating parameter to the higher or lower range after a different period of time, such as 2, 3, 4 or more than 4 seconds, e.g. based on the respective probabilities of such transitions.

The process of determining a random number and determining the transition between the ranges of the operating parameters may be repeated until the second time series of operating parameters has been determined having a desirable duration. It will be appreciated that there are multiple procedures that may be used to determine a second time series based on the probabilities determined at the second block 304 and the procedure set out above is exemplary only.

The method 300 comprises a fifth block 310, at which the vehicle assembly is controlled to perform one or more second drive cycles using one or more of the determined second time series.

In some arrangements, a further vehicle assembly may be controlled to perform one or more second drive cycles according to one or more of the second time series of operating parameters. The further vehicle assembly may be controlled in addition to or instead of the vehicle assembly being controlled. In other words, a first time series of operating parameters determined based on a drive cycle performed by the vehicle assembly may be used to determine operating parameters defining a second drive cycle, e.g. according to the method 300, and the vehicle assembly and/or a further vehicle assembly may be controlled to perform the second drive cycle.

Whilst the vehicle assembly and/or the further vehicle assembly is being controlled to perform the one or more second drive cycles, one or more performance parameters of the vehicle assembly and/or further vehicle may be determined, e.g. measured. One or more components, subassemblies and/or controllers of the vehicle assembly and/or further vehicle assembly may be configured and/or one or more calibrable parameters of the vehicle assembly and/or further vehicle assembly may be calibrated based on the determined one or more performance parameters.

FIG. 4 illustrates another method 400 of operating the vehicle assembly and/or a further vehicle assembly. The method 400 is similar to the method 300 and comprises first, second, third, fourth and fifth blocks 402, 404, 406, 408, 410 which are similar to the first, second, third, fourth and fifth blocks 302, 304, 306, 308, 310 of the method 300 described above.

The method 400 differs from the method 300 in that, at the fourth block 408, a plurality of second time series of the operating parameter are determined defining a plurality of second drive cycles. Each of the plurality of second time series may be determined using the probabilities determines in the third block 406 and using different random numbers from the others of the second time series.

The method 400 may comprise a time series selection block 414, at which one of the second time series may be selected from the plurality of second time series. The vehicle assembly and/or further vehicle may be controlled, at the fifth block 410, based on the selected second time series of operating parameters.

The method 400 may comprise an entropy determination block 412, at which entropies, e.g. information entropies, of the second time series are determined. Additionally, an entropy, e.g. information entropy, of the first time series may be determined. At the time series selection block 414, the entropies of the second time series may be compared to the entropy of the first time series and one of the second time series may be selected based on the comparison. For example, the second time series having a smallest difference in entropy compared to the first time series may be selected.

Entropy of a time series is a measure of the variability or unpredictability of the data points within the time series. One measure of entropy of a time series, referred to as Shannon entropy, is calculated according to equation (1)

$$H(X) = -\sum_{i=1}^{n} P(x_i) \log_b P(x_i) \quad (1)$$

In equation (1), $P(x_i)$ is the probability of the operating parameter being $x_i$ at a particular time in the time series and b is the base of the logarithm used, such as 2, e (Euler's number), 10 or any other number.

In one or more arrangements, entropies of the second time series and the first time series may be compared by calculating one or more relative entropies. For example, a relative entropy may be calculated for each of the second time series with respect to the first time series. The one of the second time series having the lowest relative entropy with respect to the first time series may be selected at the time series selection block 414. One measure of relative entropy is referred to as Kullback-Liebler divergence, which is calculated according to equation (2).

$$R(p, q) = \sum_{i=1}^{n} P(x_i) \log_b (P(x_i)/Q(x_i)) \quad (2)$$

In equation (2), $P(x_i)$ is the probability of the operating parameter being $x_i$ at a particular time in the first time series, $Q(x_i)$ is the probability of the operating parameter being $x_i$ at a particular time in the second time series and b is the base of the logarithm used, such as 2, e (Euler's number), 10 or any other number.

By selecting the second time series having the smallest difference in entropy and/or the smallest relative entropy with respect to the first time series, and operating the vehicle assembly based on the operating parameters of the selected second time series to perform a second drive cycle, the performance parameter data that may be measured during the second drive cycle may have a similar quality and/or quantity, e.g. variation, to the performance parameter data that could be measured when performing the first drive cycle, compared to performance parameter data that could have been measured if the vehicle assembly had been operated using the operating parameters of another of the second time series. For example, the second time series having the smallest relative entropy with respect to the first time series may define a drive cycle comprising a similar variation in manoeuvres to be performed by the vehicle assembly compared to the first drive cycle.

The method 400 may comprise a time series smoothing block 416, at which a smoothed, e.g. approximated, representation of the first time series may be determined. The smoothed version of the first time series may be a time series based on the first time series from which high frequency variations of the operating parameter have been omitted. The smoothed representation of the first time series may be determined by fitting one or more, e.g. a plurality, of polynomial curves to the first time series or portions thereof. For example, a plurality of polynomial curves may be fitted to a plurality of portions of the first time series. The portions of the time series may be portions of the time series within which the values of the operating parameter are in a particular one of the ranges identified at the second block 404.

In one arrangement, the smoothed representation of the first time series may be determined by fitting one or more splines, such as basis splines, comprising 2 or more knots to the first time series or portions of the first time series, e.g. portions of the first time series within the ranges identified at the second block 304, 404. In other arrangements, the smoothed representation of the first time series may be determined using any other method of obtaining a smoothed version of a time series.

When the method 400 comprises the time series smoothing block 416, the entropy comparison between the first and second time series may be made between the second time series and the smoothed representation of the first time series.

In some arrangements, the difference in the entropies of the one or more second time series relative to the first time series may be compared to a threshold entropy difference, e.g. a threshold entropy divergence. If the entropy difference, e.g. divergence, is greater that the threshold entropy difference, e.g. divergence, one or more further second time series may be generated. The further second time series may be generated in the same way as the second time series using different random numbers. In other words, the fourth block 408, at which the second time series are determined, may be repeated, as indicated in FIG. 4.

The blocks at which the second time series are determined, the entropies of the second time series are determined and the differences in the entropies of the one or more second time series relative to the first time series are compared to the threshold entropy difference may be repeated one or more times, e.g. until a second time series having a difference in entropy relative to the first time series that is less than the threshold entropy difference has been generated. The method 400 may then proceed to the second time series selection block 414.

The following additional, numbered statements of invention are also included within the specification and form part of the present disclosure:

Statement 1. A method of controlling a vehicle assembly, the method comprising:
determining a first time series of an operating parameter of the vehicle assembly defining a first drive cycle, the first drive cycle for testing one or more performance parameters of the vehicle assembly;
identifying a plurality of ranges of the operating parameter during the first drive cycle;
determining probabilities of the vehicle assembly operating in and/or transitioning between the ranges of the operating parameter during the first drive cycle;
determining one or more second time series of the operating parameter defining one or more second drive cycles, the one or more second time series having a different duration from the first time series, wherein the one or more second time series are determined based on the determined probabilities of the vehicle assembly operating in and/or transitioning between the ranges of the operating parameter during the first drive cycle; and
controlling the vehicle assembly and/or a further vehicle assembly to perform one or more of the second drive cycles using the determined second time series.

Statement 2. The method of statement 1, wherein determining the probabilities of the vehicle assembly operating in and/or transitioning between the ranges of the operating parameter during the first drive cycle, comprises determining, for each of the ranges of the operating parameter, the probability of the vehicle assembly transitioning from operating in the particular range to operating in another range within a particular time interval.

Statement 3. The method of statement 1 or 2, wherein the method comprises:
determining a plurality of second time series based on the determined probabilities of the vehicle assembly operating in and/or transitioning between the ranges of the operating parameter during the first drive cycle; and
selecting one of the determined second time series based on the entropy of the second time series.

Statement 4. The method of statement 3, wherein the one of the determined second time series is selected based on a comparison between an entropy of the first time series and the entropy of the second time series.

Statement 5. The method of statement 4, wherein the method comprises determining a smoothed representation of the first time series, wherein the entropy comparison between the first and second time series is made between the second time series and the smoothed representation of the first time series.

Statement 6. The method of any of the preceding statements, wherein the method further comprises:
comparing the entropies of the one or more second time series relative to the first time series to a threshold divergence; and
determining one or more further second time series if the entropies of the one or more second series are greater than the threshold divergence.

Statement 7. The method of any of the preceding statements, wherein determining the one or more second time series of the operating parameter comprises determining values of the operating parameter over a predetermined period of time using on one or more random numbers and the determined probabilities of the vehicle assembly operating in and/or transitioning between the ranges of the operating parameter during the first drive cycle.

Statement 8. The method of any of the preceding statements, wherein the method further comprises:
determining the performance parameter or a further performance parameter of the vehicle assembly and/or further vehicle assembly during the second drive cycle.

Statement 9. The method of statement 8, wherein the method further comprises:
calibrating the operation of the vehicle assembly and/or further vehicle assembly based on the performance parameter or further performance parameter determined during the second drive cycle.

Statement 10. The method of any of the preceding statements, wherein the operating parameter is a speed of the vehicle in which the vehicle assembly is provided and the performance parameter is an emissions value of the vehicle.

Statement 11. A computer-readable medium comprising instructions which, when executed by a computing apparatus, cause the computing apparatus to perform the method of any of statement 1 to 10.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

The invention claimed is:

1. A method of controlling a vehicle assembly, the method comprising:
determining a first time series of an operating parameter of the vehicle assembly defining a first drive cycle, the first drive cycle for testing one or more performance parameters of the vehicle assembly;
identifying a plurality of ranges of the operating parameter during the first drive cycle;
determining probabilities of the vehicle assembly at least one of operating in or transitioning between the ranges of the operating parameter during the first drive cycle;
determining one or more second time series of the operating parameter defining one or more second drive cycles, the one or more second time series having a different duration from the first time series, wherein the one or more second time series are determined based on the determined probabilities of the vehicle assembly at least one of operating in or transitioning between the ranges of the operating parameter during the first drive cycle; and
controlling at least one of the vehicle assembly or a further vehicle assembly to perform one or more of the second drive cycles using the determined second time series.

2. The method of claim 1, wherein determining the probabilities of the vehicle assembly at least one of operating in or transitioning between the ranges of the operating parameter during the first drive cycle, comprises determining, for each of the ranges of the operating parameter, a probability of the vehicle assembly transitioning from operating in the particular range to operating in another range within a particular time interval.

3. The method of claim 1, wherein the method further comprises:
determining a plurality of second time series based on the determined probabilities of the vehicle assembly at least one of operating in or transitioning between the ranges of the operating parameter during the first drive cycle; and selecting one of the determined second time series based on an entropy of the second time series.

4. The method of claim 3, wherein the one of the determined second time series is selected based on a comparison between an entropy of the first time series and the entropy of the second time series.

5. The method of claim 4, wherein the method further comprises determining a smoothed representation of the first time series, wherein the entropy comparison between the first and second time series is made between the second time series and the smoothed representation of the first time series.

6. The method of claim 4, wherein the method further comprises:
   comparing the entropies of the one or more second time series relative to the first time series to a threshold divergence; and
   determining one or more further second time series if the entropies of the one or more second series are greater than the threshold divergence.

7. The method of claim 1, wherein determining the one or more second time series of the operating parameter comprises determining values of the operating parameter over a predetermined period of time using one or more random numbers and the determined probabilities of the vehicle assembly at least one of operating in or transitioning between the ranges of the operating parameter during the first drive cycle.

8. The method of claim 1, wherein the method further comprises:
   determining the performance parameter or a further performance parameter at least one of the vehicle assembly or the further vehicle assembly during the second drive cycle.

9. The method of claim 8, wherein the method further comprises:
   calibrating the operation of the at least one of the vehicle assembly or further vehicle assembly based on the performance parameter or further performance parameter determined during the second drive cycle.

10. The method of claim 1, wherein the operating parameter is a speed of the vehicle in which the vehicle assembly is provided and the performance parameter is an emissions value of the vehicle.

11. A non-transitory computer-readable medium comprising instructions which, when executed by a computing apparatus, cause the computing apparatus to perform:
   determining a first time series of an operating parameter of the vehicle assembly defining a first drive cycle, the first drive cycle for testing one or more performance parameters of the vehicle assembly;
   identifying a plurality of ranges of the operating parameter during the first drive cycle;
   determining probabilities of the vehicle assembly at least one of operating in or transitioning between the ranges of the operating parameter during the first drive cycle;
   determining one or more second time series of the operating parameter defining one or more second drive cycles, the one or more second time series having a different duration from the first time series, wherein the one or more second time series are determined based on the determined probabilities of the vehicle assembly at least one of operating in or transitioning between the ranges of the operating parameter during the first drive cycle; and
   controlling at least one of the vehicle assembly or a further vehicle assembly to perform one or more of the second drive cycles using the determined second time series.

12. The medium of claim 11, wherein determining the probabilities of the vehicle assembly at least one of operating in or transitioning between the ranges of the operating parameter during the first drive cycle, comprises determining, for each of the ranges of the operating parameter, a probability of the vehicle assembly transitioning from operating in the particular range to operating in another range within a particular time interval.

13. The medium of claim 11, wherein the medium further comprises instructions for the computing apparatus to perform:
   determining a plurality of second time series based on the determined probabilities of the vehicle assembly at least one of operating in or transitioning between the ranges of the operating parameter during the first drive cycle; and
   selecting one of the determined second time series based on an entropy of the second time series.

14. The medium of claim 13, wherein the one of the determined second time series is selected based on a comparison between an entropy of the first time series and the entropy of the second time series.

15. The medium of claim 14, wherein the medium further comprises instructions for the computing apparatus to perform determining a smoothed representation of the first time series, wherein the entropy comparison between the first and second time series is made between the second time series and the smoothed representation of the first time series.

16. The medium of claim 14, wherein the medium further comprises instructions for the computing apparatus to perform:
   comparing the entropies of the one or more second time series relative to the first time series to a threshold divergence; and
   determining one or more further second time series if the entropies of the one or more second series are greater than the threshold divergence.

17. The medium of claim 11, wherein determining the one or more second time series of the operating parameter comprises determining values of the operating parameter over a predetermined period of time using one or more random numbers and the determined probabilities of the vehicle assembly at least one of operating in or transitioning between the ranges of the operating parameter during the first drive cycle.

18. The medium of claim 11, wherein the medium further comprises instructions for the computing apparatus to perform:
   determining the performance parameter or a further performance parameter of at least one of the vehicle assembly or the further vehicle assembly during the second drive cycle.

19. The medium of claim 18, wherein the medium further comprises instructions for the computing apparatus to perform:
   calibrating the operation of the at least one of the vehicle assembly or further vehicle assembly based on the performance parameter or further performance parameter determined during the second drive cycle.

20. The medium of claim 11, wherein the operating parameter is a speed of the vehicle in which the vehicle assembly is provided and the performance parameter is an emissions value of the vehicle.

* * * * *